June 17, 1952 — P. P. E. HARDY — 2,601,137
FILTRATION PLANT FLOW CONTROL RESPONSIVE TO DEMAND
Filed March 22, 1949 — 3 Sheets-Sheet 3
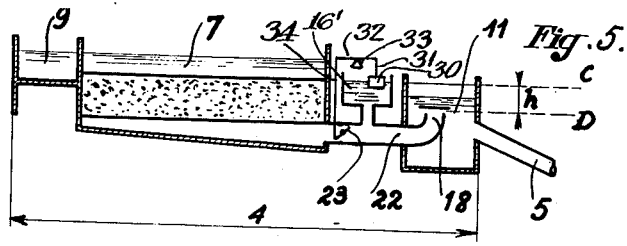
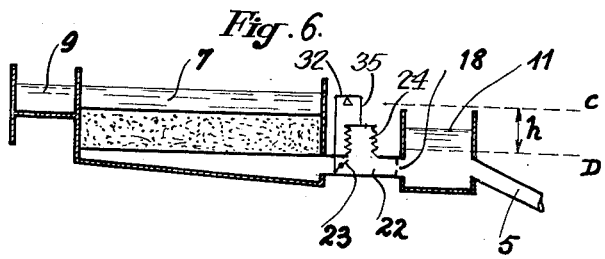
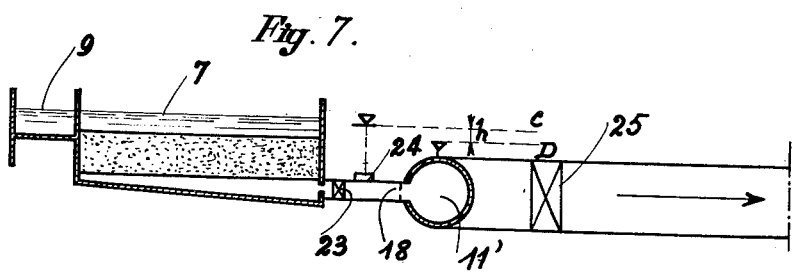
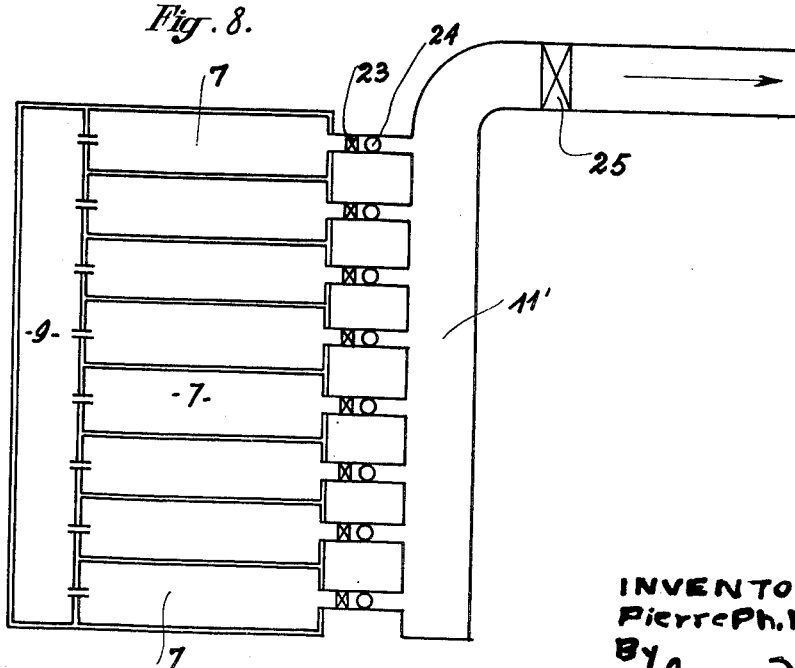
INVENTOR
Pierre Ph. E. Hardy
BY George Hleney
ATTORNEY Patented June 17, 1952

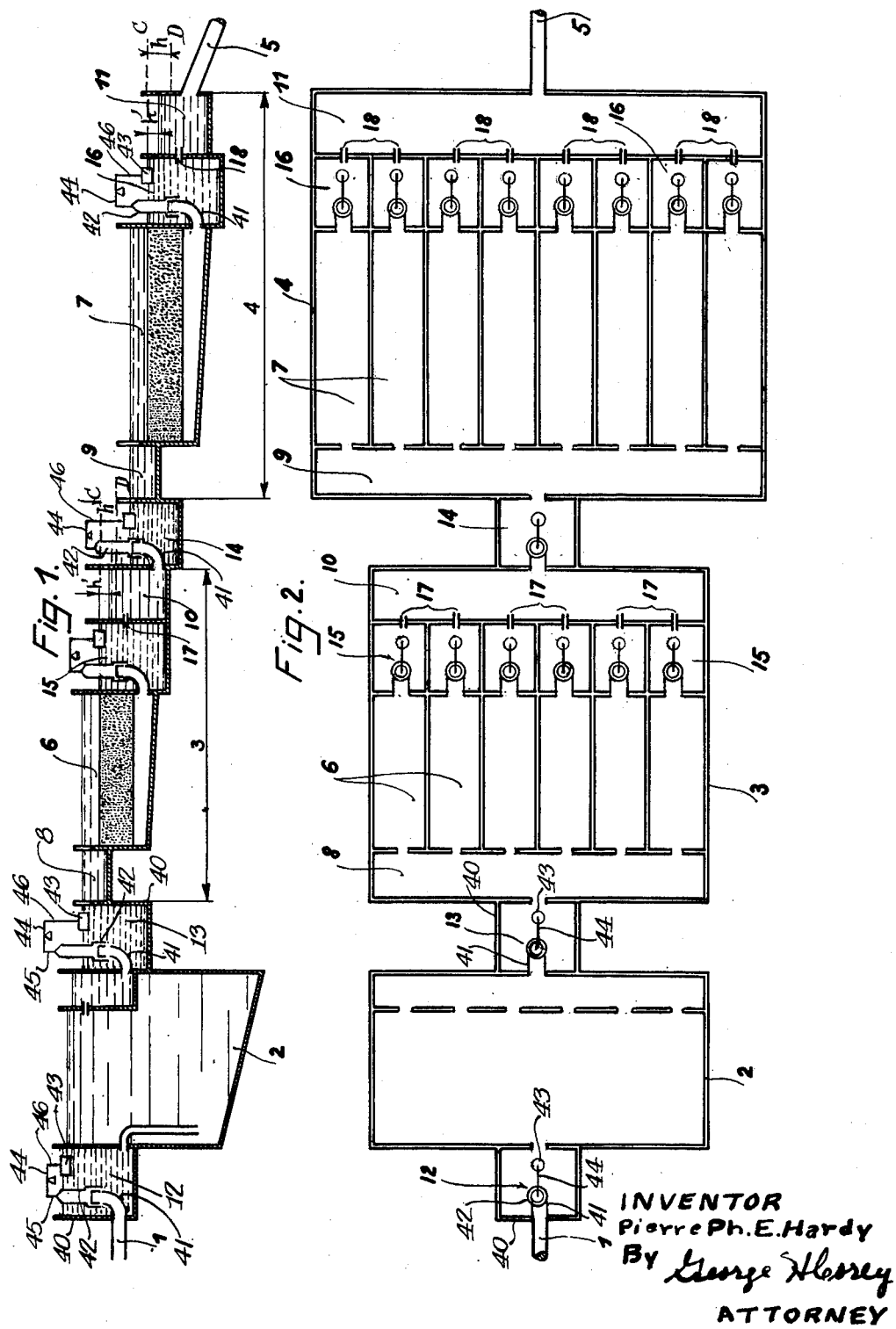

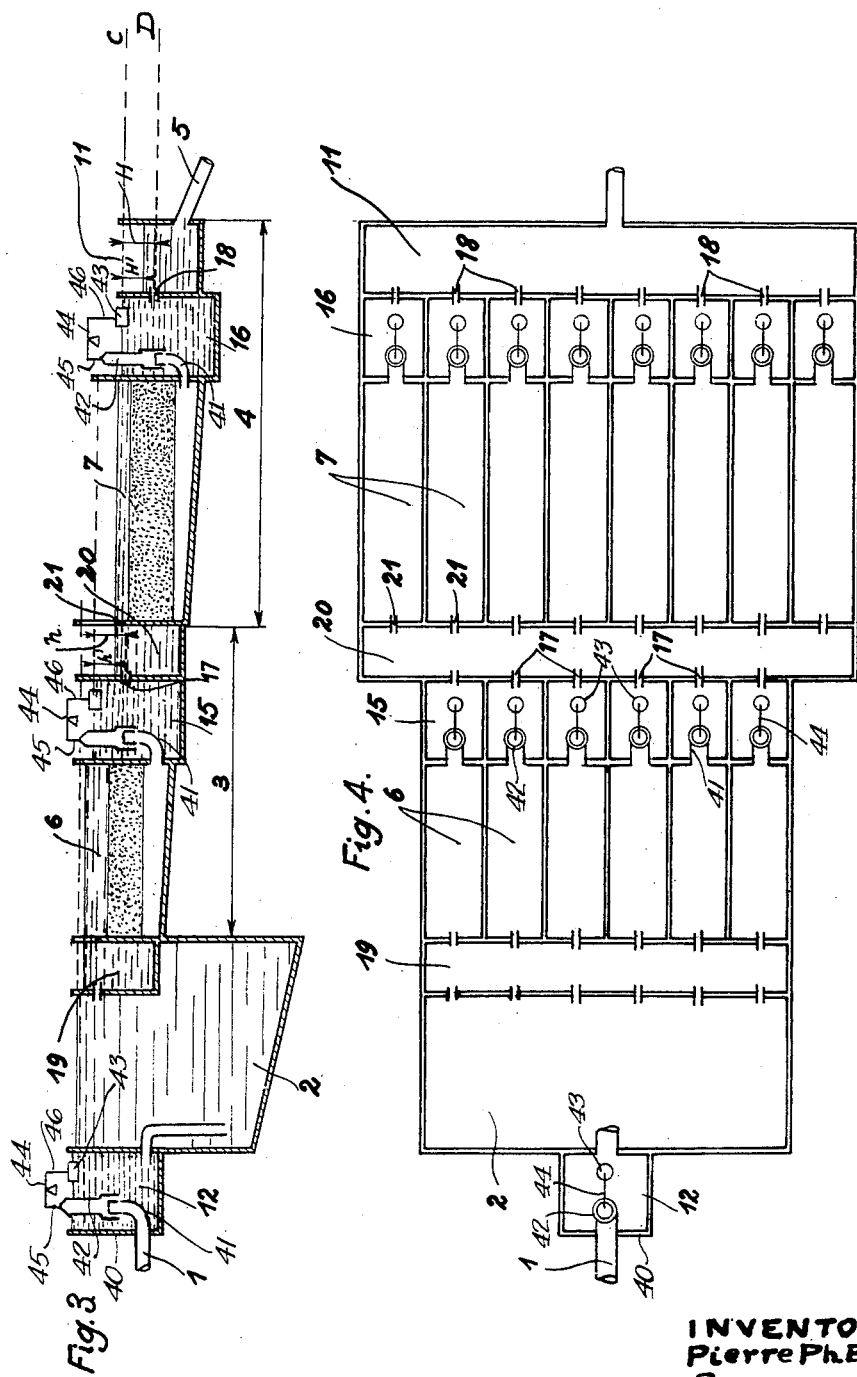

2,601,137

UNITED STATES PATENT OFFICE 2,601,137

FILTRATION PLANT FLOW CONTROL RESPONSIVE TO DEMAND

Pierre P. E. Hardy, Neuilly-sur-Seine, France, assignor to C. Chabal & Cie (Societe en Commandite par Actions) and Etablissements Neyrpic, Paris, France, both companies of France Application March 22, 1949, Serial No. 82,814
In France March 26, 1948

10 Claims. (Cl. 210—122.1)

The water flow of a filtration plant is adjusted by means of water-gate or cock devices arranged either above or below the plant, which are either self-acting or operated by hand. In the case of an automatic control, the filtered water-flow is either constant or such that it corresponds to the value of the available water-flow above the filtration plant.

My invention relates to a system self-adjusting the flow (from zero up to a certain limit) according to the quantity of required filtered water.

An important object of the invention is to provide each component unit forming the filtration plant (flocculators, decanting reservoirs, filters) with a level adjusting device arranged and adapted to increase the water-flow leaving each component unit when the down stream requirement for water increases and with fixed orifices, arranged at the outlet of each component unit, which are fed under a head corresponding to the difference in level between the next down-stream level and the level maintained substantially constant by means of the adjusting device of the corresponding component unit.

By means of this combination, the level in the stage just below each adjusting device is maintained at a substantially constant altitude, each device having a tendency to allow the flow to increase when the down-stream level has a tendency to lower and inversely to close the port of the adjusting device when the down-stream level has a tendency to rise. This arrangement enables not only to adjust the flow of each adjusting device to the requirement of filtered water, but also to compensate the average partial chokings of each stage and the partial choking of each reservoir individually considered in such a manner that the various reservoirs of a stage treat in practice equal or proportional flows, whatever be their respective degree of choking.

The adjusting devices may be of any type comprising a port the useful opening of which is dependent on the down-stream level, the arrangement of the whole set being such that this level is maintained substantially constant, the flow adjusting device having with that object a tendency to close when the down-stream level has a tendency to rise and to open when the down-stream level has a tendency to lower. Such devices may consist of balanced valves of the type described in French Patent No. 881,466.

Between each stage of the plant it is possible, when desired, to arrange a level adjusting device which establishes a maximum level for the stage immediately down-stream therefrom. In that case it is necessary to provide for each stage an outlet collector canal and an inlet distributing canal. When there are no level adjusting devices between the stages, it is possible to use the collector canal of any stage as a distributing canal for the next lower stage. The equipment of the plant is thus simplified; however it is necessary to raise the walls of the lowest stages which may be submitted to greater changes of level if the level varies between wide limits.

As in fact a hydrostatic level corresponds to a pressure, it is understood that by "level adjusting devices" I also mean all apparatus enabling to maintain a constant hydraulic pressure. In the course of the present description an example is given of such an apparatus used in a plant according to the invention.

When the various reservoirs or apparatus of a stage are not identical, the system according to the invention automatically ensures, for each one of them a water flow proportional to its usual working capacity. It wil be sufficient to provide each reservoir or apparatus with a level adjusting device, maintaining at its outlet a constant level or pressure, and to proportion the section of the fixed orifices to the flow to be ensured.

A filtration plant is always designed for a maximum water flow which should not be exceeded. Various conventional means to limit this water flow are known.

Another object of the invention is to obtain this result in a particularly simple way, by arranging the fixed orifices at such a level that, when the maximum water flow is reached, each orifice is unwatered and consequently is no longer submitted to the pressure of the down-stream level and yields the predetermined maximum water flow which cannot be exceeded.

Other objects and advantages of the invention will be apparent during the course of the following description.

In the accompanying drawing forming a part of this application and in which like numerals are employed to designate like parts throughout, Figure 1 is a longitudinal section of a filtration plant whose adjustment is obtained according to the invention, Figure 2 is a plan view corresponding to Figure 1, Figure 3 is a longitudinal section of a simplified filtration plant in which the various, parallel connected component units of a same stage are identical, Figure 4 is a plan view corresponding to Figure 3, Figures 5, 6, 7 are partial longitudinal sections of embodiments of the arrangement shown in Figure 1, and, Figure 8 is a plan view corresponding to Figure 7.

In the embodiment shown in Figures 1 and 2, the plant comprises a canal 1 feeding the raw water, a decanting reservoir 2 followed by two series connected filtration stages 3 and 4, and a filtered water duct 5. Each filtration stage comprises respectively a series of filtering reservoirs 6, 7 arranged in parallel between distributing, feeding canals 8, 9 and stage collector canals 10, 11. Before each stage, level adjusting devices are provided: 12 for the decanting reservoir, 13 for the first filtering stage and 14 for the last filtering stage. These adjusting devices may be of any type, such as balanced valves described in the above cited French patent or, as shown in Fig. 1, are formed by a water chamber 40 in direct communication with the next following stage, and in which is mounted a tubular valve 41 connected to the next upper stage or to the canal 1, the moving bell 42 of said valve being coupled to a float 43, arranged in said water chamber 40, through an oscillating lever 44, pivoted between its extremities and links 45 and 46. The object of these adjusting devices is to maintain the levels of the stage which they control constant, and consequently they allow the passage of a greater flow when the down-stream level lowers and conversely reduce the flow— occasionally down to zero—when the downstream level has a tendency to rise. In addition each reservoir 6, 7 is provided with an individual adjusting device 15, 16 of the same type as the above described devices 12, 13 and 14 which is arranged—on the down-stream side and communicating with the corresponding stage collector canal 10, 11 by means of a fixed orifice 17, 18 provided in the wall separating said collector canal and the individual water chambers of the corresponding adjusting devices. The fixed orifices have such a section that they cause a loss of head $h$ for the maximum flow which is considered and should not be exceeded, this loss of head being the same for all the reservoirs of a stage.

This height $h$ appears between the constant level "C" in the corresponding water chamber 40 and the minimum level "D" which it is possible to set in the collector canal. Conventional means may be provided to obtain a minimum level, corresponding in fact to the maximum flow which should not be exceeded.

In Figures 1 and 2, each adjusting device is shown in a separate water chamber, but it is evident that said chamber may be a part of the adjusting device itself, as shown in Figure 5, or may be omitted as will be explained with reference to Figures 6 to 8.

The operation of the plant is as follows:

When the requirement for filtered water increases, the level in the collector canal 11 has a tendency to lower, causing the level to lower in the water chambers of the adjusting devices 16. These devices then allow the passage of a greater flow for maintaining the level in the water chambers 40 at the altitude C to meet the outside requirement. This increase of the flow has a tendency to lower the level of reservoirs 7 and feed canal 9, and consequently the stage adjusting device 14 opens to set again at the previous altitude the level of the stage 4 which it controls. The same steps are carried on by degrees up to the decanting reservoir 2 whose lowering level causes the inlet adjusting device 12 to work in such a manner that it opens in order to allow a larger quantity of raw water to enter the plant from the duct 1. On the contrary, when the requirement for filtered water decreases, the levels have a tendency to rise and the reverse of the above process is effected, the individual adjusting devices and the stage adjusting devices having a tendency to reduce the flows.

It is easy to understand that at any moment, apart from an unimportant time-lag, the water flow of the plant at each point is automatically adjusted according to the outside requirement. The adjusting devices are of course adjusted in such a manner that they are entirely closed when the maximum levels are everywhere reached.

It is to be noted that this system also compensates for partial choking in each filtering stage. In fact, when a filtering stage becomes partially choked, the flow which it yields decreases, and the level at its outlet has a tendency to lower, which causes the adjusting device to open sufficiently to compensate for the partial choking.

Because of the fixed orifices 17 and 18, the above described plant ensures not only compensation of the mean partial choking of a stage but also compensation of the respective partial choking of each reservoir of this stage, in such a manner that all reservoirs treat equal flow whatever be their respective degree of choking. In fact, assuming for instance that one of the reservoirs 6 of the first filtering stage 3 is more choked than the other reservoirs of the stage, it allows the passage of a smaller flow, and the loss of head in the corresponding fixed orifice 17 is smaller than in the neighbouring reservoirs. Consequently the level in the water chamber of the corresponding adjusting device 15 lowers more than in the neighbouring water chambers and that adjusting device opens more, which helps to bring the flow of this reservoir up to the flow of the neighbouring reservoirs of the same stage.

The plant shown in Figures 3 and 4 also comprises a canal 1 feeding the raw water, a decanting reservoir 2, followed by two series connected filtration stages 3 and 4, a filtered water duct 5, and a level adjusting device 12, operated by means of the next down-stream level, which maintains the level in the decanting reservoir 2. Between the decanting reservoir and the first filtration stage however, and between the two filtration stages, the level adjusting devices are omitted. The exit canal 19 of the decanting reservoir is thus used, as shown in Figure 3, as a distributing canal feeding the parallel connected, filtering reservoirs 6, and the collector canal 20, receiving the water leaving the first filtration stage 3, is used as a distributing canal feeding the filtering reservoirs 7 of the second filtration stage 4. Consequently the canal 20 is fed by means of the fixed orifices 17, associated with the level adjusting devices 15, and, in its downstream wall the sills 21 feeding the reservoirs 7 are provided.

When the flow of the plant is normal, the down-stream collector canal 11 and the composite canal 20 are respectively fed, under a head $H'$ and $h'$ by means of the submerged sized ports 18, 17, the adjusting devices 16, 15 operating to allow the passage of a larger flow when, because of an increasing down-stream flow, the loss of head H' or h' increases, and inversely to reduce the flow when H' or h' has a tendency to decrease. However it is to be noted that the adjusting devices 15, 16, operated by the down-stream side, cannot stop the up-stream level of their stage, which is dependent on the adjusting devices of the immediately preceding stage. As a result, when the requirement for filtered water falls down to zero or considerably decreases, the up-stream level of the lower stages will have a tendency to rise up to, at the limit, the constant level maintained by means of the adjusting device of the up-stream stage. Consequently it may be necessary to raise the walls of the lower stages up to that level as shown in Figure 3.

It will be noted that the fixed orifices 17, 18 associated with the individual level adjusting devices are much nearer the free surface of the water contained in canals 11 and 20 in Figure 3 than in Figure 1. Their altitude D is, in fact, that corresponding to the water level in canals 11 and 20, when the predetermined maximum flow is reached. After that moment, the fixed orifices are unwatered and then deliver under a constant load H or h which appears between the constant level C of the water chamber of the adjusting devices 15 and 16 and the minimum level D which it is possible to set in the collector canal. If the water flow required down-stream increases above that predetermined maximum flow, the level in the collector canal 11 may lower, but as the loads H and h remain constant, the water flow passing through the plant will remain constant and equal to the maximum predetermined flow.

In the embodiment shown in Figure 5, a duct 22 is provided between the reservoir 7 and the collector canal 11. This duct may be more or less closed by means of a closing device such as a gate 23 operated by the level of the branched water chamber 16', by means e. g. of a float 30 acting through a link 31 at one extremity of a lever 32 pivoted between its extremities at 33 and whose second extremity operates gate 23 through a connecting rod 34 so as to open gate 23 when float 30 lowers by reason of an increasing of the down-stream flow, and conversely to close gate 23 when the down-stream flow decreases. The total flow of the filtering reservoir 7 which, in the device of Figures 1 to 4, passed through the water chamber 16, does not pass here through that chamber. In Figure 5, the fixed orifice 18 is arranged at the minimum altitude D such as under the above defined load $h=C-D$, each orifice delivers the maximum flow which is predetermined for the corresponding component unit of the stage. As soon as the level in the common collecting canal is equal to or lower than D, the orifices are unwatered, and are no longer submitted to the down-stream level and deliver the predetermined maximum flow whatever be the level in the collector canal. In this case, the fixed orifices 18 will preferably have a small height and a comparatively large horizontal section.

In the modification shown in Figure 6, for the constant level maintained in the water chamber 16 or 16' of the preceding devices is substituted a constant pressure in the duct 22, which pressure is maintained and measured by means of a manometric member, e. g. a manometric bellows 24 coupled through link 35 to the lever 32 operating the gate 23 in the same manner as in the case of Fig. 5, the arrangement being such that bellows 24 opens gate 23 when the pressure in bellows 24 tends to decrease by reason of a greater down-stream water flow, and conversely tends to close gate 23 when the pressure in bellows 24 increases. The loss of head h is, in this case, shown by the difference of altitude between a line C at an altitude corresponding to the constant pressure adjusted and measured by means of the membrane 24, and the above defined line D.

The difference between the embodiment shown in Figures 7 and 8 and the embodiment shown in Figures 6 is the fact that for the collector canal 11 there is substituted a loaded duct 11'. The loss of head h, which is a consequence of the fixed orifices 18, is then shown by the difference of altitude between the line C, defined with respect to Figure 6, and a line D drawn at an altitude corresponding to the minimum pressure admitted in the main collector 11'. In order to have in that collector a pressure which is never below that minimum, any appropriate device 25 of a known type may be arranged down-stream in the collector 11', for limiting the flow to the predetermined maximum value.

In case the maximum water flow is predetermined as a function of the component unit arranged up-stream, all the losses of head h remain equal, but the sections of the fixed orifices will be proportional to the different required flows or to the flows for which the units, having different dimensions and arranged in parallel are built. It is just the case in the plants where it is required to admit a liquid chemical product in a certain proportion of the total delivered flow. This problem is solved in a particularly simple way by means of the system according to the invention. It would also be the case for plants whose object would be to obtain mixtures of different liquids, and which it would be desirable to automatically operate according to the requirement.

What I claim is:

1. A filtration plant adapted to filter an entering water flow through a plurality of connected components at different water levels, comprising a feeding canal for the raw water, a distributing reservoir connected to said feeding canal, at least one filtration stage formed by a series of filtering units arranged in parallel and adapted to receive the water flowing from said distributing reservoir, each filtering unit including a filtering reservoir and means for controlling the water flow passing through said filtering unit according to the downstream requirements of filtered water, said controlling means comprising in combination, for each filtering unit, a water chamber connected to the downstream end of said filtering reservoir of the unit, a valve, means actuated by the head of the water in said chamber for operating said valve to allow the passage of a greater flow from said filtering reservoir to said chamber when the level therein has a tendency to lower and conversely to reduce the flow when said chamber level has a tendency to rise, so as to maintain a predetermined level in said water chamber, and means defining a fixed orifice in the outlet of said chamber and adapted to deliver the water flowing from said filtering unit under a head regulated by the predetermined level in said water chamber, and for all the filtering units of the same stage a common collector adapted to receive through said fixed orifices of the stage the water flowing from said filtering reservoirs, said fixed orifices having such a section as to cause a predetermined loss of head which is the same for all the orifices of the same filtering stage when each filtering unit delivers its maximum flow, whereby said entering flow is automatically adjusted to the requirements of filtered water and distributed between said filtering reservoirs in such a manner that any of said filtering reservoirs of a given stage allow to pass in practice always the same proportion of said entering flow whatever be its relative degree of choking.

2. A filtration plant according to claim 1 in which the flow controlling means of each said filtering unit is arranged at the exit of said respective filtering reservoir.

3. A filtration plant according to claim 1 in which said stage common collector is formed by an open compartment.

4. A filtration plant according to claim 1 comprising at least two series connected filtration stages, the altitude of the second stage being lower than that of the first one, said second stage being adapted to receive the filtered water flowing from the first stage; and including flow controlling means at the inlet of each stage and adapted to maintain a constant level therein by allowing the passage of a greater flow when the level of said stage lowers and conversely reducing the flow occasionally down to zero when the level of said stage has a tendency to rise.

5. A filtration plant according to claim 1 further comprising at least two series connected filtration stages, the altitude of the second stage being lower than that of the first one, a canal provided between said two successive stages and adapted to collect the filtered water flowing from the fixed orifices of said first stage and to distribute said water to the said second stage, said filtering units of each stage having walls extending to an altitude at least equal to the constant level maintained by the flow controlling means level of the above next upstream component of said plant.

6. A filtration plant according to claim 1 including a common collector receiving the filtered water flowing from the last filtering stage and comprising a collecting compartment and a closed duct connected to said compartment, means for adjusting the flow of said last filtering stage in response to the variations of the pressure in said duct, and a pressure regulating device at the exit of said compartment and adapted to maintain in said compartment a pressure above a predetermined minimum value.

7. A filtration plant according to claim 2 in which said filtering units arranged in parallel comprise units having different dimensions, the fixed orifices of the means controlling the water flow of each unit are fed under the same head and the sections of said orifices are proportional to the working capacities of each filtering unit, whereby the flows of said orifices are in proportional relationship.

8. A filtration plant according to claim 1 in which said fixed orifices provided in the outlet of said water chambers are arranged at a predetermined level so that their downstream ends are uncovered when the maximum flow of said plant is reached whereby the filtered water flow is automatically limited.

9. A filtration plant according to claim 8 in which said fixed orifices have a horizontally elongated section.

10. A filtration plant adapted to filter an entering water flow through a plurality of connected components at different water levels, comprising a feeding canal for the raw water, a distributing reservoir connected to said feeding canal, at least one filtration stage formed by a series of filtering units arranged in parallel and adapted to receive the water flowing from said distributing reservoir, and means for controlling the water flow passing through said filtering units according to the down-stream requirements of filtered water, said controlling means comprising in combination, for each filtering unit, a valve connected to the exit of the filtering reservoir of the unit, a duct arranged at the outlet of said valve, a manometric member in open communication with said duct, means actuated by the pressure in said manometric member for operating said valve to allow the passage of a greater flow from said filtering reservoir to said duct when the pressure therein has a tendency to lower and conversely to reduce the flow when the pressure in the duct has a tendency to rise, so as to maintain a predetermined pressure in said duct, means defining a fixed orifice in the outlet of said duct adapted to deliver the water flowing from said filtering unit under a pressure regulated by the predetermined pressure in said duct; and for all the filtering units of the same stage, a common collector adapted to receive through said fixed orifices of the stage the water flowing from said filtering reservoirs, said fixed orifices having such a section as to cause a predetermined loss of head which is the same for all the orifices of the same filtering stage when each filtering unit delivers its maximum flow.

PIERRE PH. E. HARDY.

REFERENCES CITED

The following references are of record in the file of this patent:

UNITED STATES PATENTS

| Number | Name | Date |
|---|---|---|
| 373,257 | Waeshi et al. | Nov. 15, 1887 |
| 409,611 | Murphy | Aug. 20, 1889 |
| 603,483 | Hefel | May 3, 1898 |
| 713,896 | Maignen | Nov. 18, 1902 |
| 799,180 | McClintock | Sept. 12, 1905 |
| 917,381 | Twiford | Apr. 6, 1909 |
| 1,062,981 | Lynde | May 27, 1913 |
| 2,238,108 | Gates | Apr. 15, 1941 |
| 2,451,029 | Hughes | Oct. 12, 1948 |